(12) United States Patent
Lang et al.

(10) Patent No.: US 11,131,777 B2
(45) Date of Patent: Sep. 28, 2021

(54) METHOD, ELECTRONIC CONTROL DEVICE AND SYSTEM FOR POSITION DETERMINATION

(71) Applicant: Robert Bosch GmbH, Stuttgart (DE)

(72) Inventors: Steffi Lang, Ludwigsburg (DE); Michael Baus, Bietigheim-Bissingen (DE); Thorsten Huck, Murr (DE)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 15/775,983

(22) PCT Filed: Oct. 20, 2016

(86) PCT No.: PCT/EP2016/075184
§ 371 (c)(1),
(2) Date: May 14, 2018

(87) PCT Pub. No.: WO2017/102141
PCT Pub. Date: Jun. 22, 2017

(65) Prior Publication Data
US 2018/0372884 A1    Dec. 27, 2018

(30) Foreign Application Priority Data
Dec. 14, 2015    (DE) .................... 10 2015 225 136.5

(51) Int. Cl.
*G01S 19/47*    (2010.01)
*G01S 19/49*    (2010.01)
(52) U.S. Cl.
CPC .............. *G01S 19/47* (2013.01); *G01S 19/49* (2013.01)

(58) Field of Classification Search
CPC ..... G01S 19/47; G01S 19/49; B60G 2300/02; B60W 40/10
(Continued)

(56) References Cited

U.S. PATENT DOCUMENTS 4,283,087 A * 8/1981 Kauss ................ B62D 33/0608
296/190.07
5,818,383 A * 10/1998 Stockburger .............. G01S 3/46
342/109
(Continued)

FOREIGN PATENT DOCUMENTS

DE    100 31 244 A1    1/2002
JP    H06-317652 A    11/1994
(Continued)

OTHER PUBLICATIONS

English translation of Written Opinion on PCT/EP2016/075184 (dated Year: 2017).*
(Continued)

*Primary Examiner* — Olumide Ajibade Akonai
(74) *Attorney, Agent, or Firm* — Maginot, Moore & Beck LLP

(57) ABSTRACT

A method for determining a position of a motor vehicle that has a chassis and a driver's cab, which is spring-mounted relative to the chassis includes detecting the position of the motor vehicle using a satellite-based navigation device arranged on the driver's cab. The method further includes correcting the detected position as a function of a correction value representing a relative motion between the driver's cab and the chassis in order to determine the position.

18 Claims, 2 Drawing Sheets

(58) Field of Classification Search
USPC .................................................. 342/357.3
See application file for complete search history.

(56) References Cited

U.S. PATENT DOCUMENTS

| | | | | |
|---|---|---|---|---|
| 5,971,493 | A | * 10/1999 | Robert | B60P 1/045 |
| | | | | 280/6.154 |
| 6,073,066 | A | * 6/2000 | Takahashi | B60G 17/016 |
| | | | | 180/89.12 |
| 2009/0150075 | A1 | 6/2009 | Watanabe et al. | |
| 2014/0358378 | A1* | 12/2014 | Howard | B60N 2/501 |
| | | | | 701/45 |
| 2014/0358380 | A1* | 12/2014 | Rausch | B60G 17/0165 |
| | | | | 701/49 |
| 2014/0358434 | A1 | 12/2014 | Zhang et al. | |
| 2015/0276936 | A1* | 10/2015 | Friend | G01S 19/47 |
| | | | | 701/472 |

FOREIGN PATENT DOCUMENTS

| | | |
|---|---|---|
| JP | H09-115013 A | 5/1997 |
| JP | H09-211100 A | 8/1997 |
| JP | H11-190771 A | 7/1999 |
| JP | H11-281727 A | 10/1999 |
| JP | 2008-015531 A | 1/2008 |
| JP | 2009-139227 A | 6/2009 |
| JP | 2012-237630 A | 12/2012 |

OTHER PUBLICATIONS

International Search Report corresponding to PCT Application No. PCT/EP2016/075184, dated Jan. 5, 2017 (German and English language document) (5 pages).

* cited by examiner

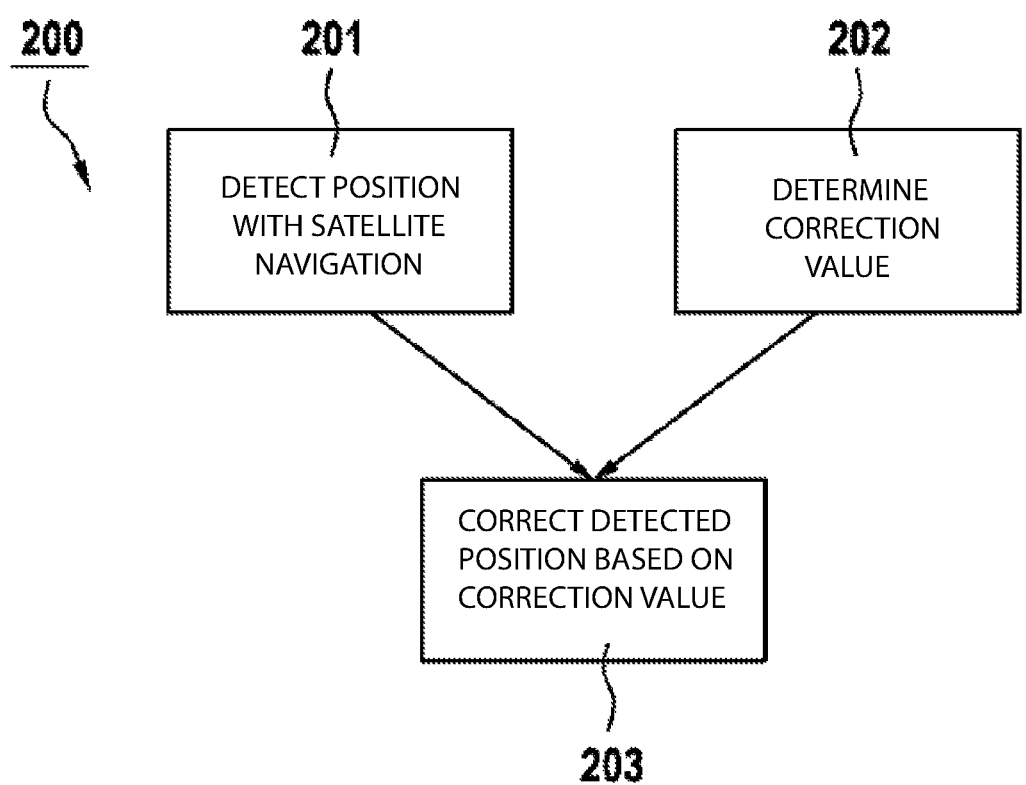

METHOD, ELECTRONIC CONTROL DEVICE AND SYSTEM FOR POSITION DETERMINATION

This application is a 35 U.S.C. § 371 National Stage Application of PCT/EP2016/075184 filed on Oct. 20, 2016, which claims the benefit of priority to Serial No. DE 10 2015 225 136.5, filed on Dec. 14, 2015 in Germany, the disclosures of which are incorporated herein by reference in their entirety.

BACKGROUND

Sensors for motion control and localization, or position determination of vehicles, especially passenger cars, for e.g. highly automated driving functions are known from the prior art.

These include, in particular, sensors for position determination by means of satellite-based navigation devices coupled with an inertial sensor, in order to minimize the tolerance of the position determination.

SUMMARY

The disclosure extends the use of such sensors to applications with lorries (HGVs).

The described disclosure enables a highly accurate localization or position determination of lorries. A special challenge here involves the driver's cab suspension, which is spring-mounted relative to the chassis.

Because the driver's cab in lorries is spring-mounted relative to the chassis, accelerations acting on the lorry lead to movements relative to the driver's cab, in particular to rolling and pitching movements, which the chassis does not execute.

The disclosure describes a method and a device that minimizes the impact of these movements.

This is achieved by means of a method and the associated computer program, and by an electronic control unit and a system as disclosed.

The method of the disclosure relates to determining the position of a motor vehicle, in particular a lorry, wherein the motor vehicle comprises a chassis and a driver's cab, which is spring-mounted relative to the chassis. The position of the vehicle is detected by means of a satellite-based navigation device arranged on the driver's cab, wherein in order to determine the position of the motor vehicle the detected position is corrected as a function of a correction value which represents a relative motion between the driver's cab and the chassis.

Advantageous embodiments are obtained from the disclosure.

The arrangement of the satellite-based navigation device or of the GNSS receiver module, or at least of the antenna of the GNSS receiver module on the driver's cab, preferably on the roof of the cab, is advantageous, since this allows the "line of sight" to the satellites of the global navigation satellite systems (GNSS) used to be established without interfering influences of components of the motor vehicle.

In one embodiment of the method the correction value is determined as a function of a signal of an inertial sensor, in particular an acceleration sensor, arranged in the chassis.

By the use of the signal of an inertial sensor mounted on the chassis, in particular an acceleration sensor, in order to determine the correction value it is possible to ensure that the tolerances of the position identified by the satellite-based navigation device, based on signals that are as free as possible from influences of the movements of the spring-mounted driver's cab, are minimized.

A highly accurate localization or position determination can be performed based on GNSS information coupled with the signals and/or the information of an acceleration and/or inertial sensor. An improved performance, i.e., in particular, a minimized tolerance in the position determination, can be achieved by the use of a so-called "tightly coupled" system or approach.

The term "tightly coupled" approach in the present case is to be understood to mean that the tolerance of the position determination of a satellite-based navigation device is improved by the coupling with an inertial and/or acceleration sensor, wherein the inertial and/or acceleration sensor is arranged as close as possible to the GNSS receiver module, or the antenna of the GNSS receiver module, of the satellite-based navigation device.

In accordance with an embodiment of the disclosure to detect the position a signal is additionally used which originates from an inertial sensor, in particular from an acceleration sensor, which is arranged in or on the navigation device.

Preferably, this inertial sensor or acceleration sensor is arranged in or on the navigation device in accordance with the "tightly coupled" approach.

According to an alternative variant of this embodiment, the correction value is dependent on the two signals of the inertial sensors or acceleration sensors. In other words, the correction value is determined as a function of the signal of the inertial sensor and/or acceleration sensor which is arranged in or on the navigation device, and as a function of the signal of the inertial sensor and/or acceleration sensor which is arranged on the chassis of the vehicle.

This allows the performance of the position determination of satellite-based navigation device to be further improved.

Preferably, the correction value is determined depending on a comparison of these two signals. By means of this comparison, the influences of the spring-mounted cab can be effectively eliminated. The comparison is carried out using known methods for comparing two signals from inertial sensors or acceleration sensors.

According to a further aspect of the disclosure, the correction value is alternatively or additionally determined as a function of a signal of a height sensor or distance sensor representing a movement of the driver's cab. In particular, this involves the detection of a movement of the driver's cab in a substantially vertical direction, in particular in relation to the chassis.

A height sensor or distance sensor in the present case can be understood to mean a device for distance determination of motor vehicle parts. Such a device is designed in such a way that using a suitable measurement principle the distance between the driver's cab and the chassis can be determined, in particular in the vertical direction.

Preferably, this determination is performed dynamically, so that the influence of the movement of the driver's cab on the device for position determination can be determined, or at least approximately detected, in order to correct for it or compensate for it to improve the position determination.

In addition, this disclosure relates to a system for determining the position of a motor vehicle, in particular of a lorry, wherein the motor vehicle comprises a chassis and a driver's cab which is spring-mounted relative to the chassis, wherein the system comprises a satellite-based navigation device, wherein the system is designed in such a way that the system executes the method of the disclosure.

Such a system minimizes the tolerance of the position determination by means of a satellite-based navigation device.

BRIEF DESCRIPTION OF THE DRAWINGS

In the following, embodiments of the disclosure are presented and explained based on the drawings. Shown are.

DETAILED DESCRIPTION

Figure 1:
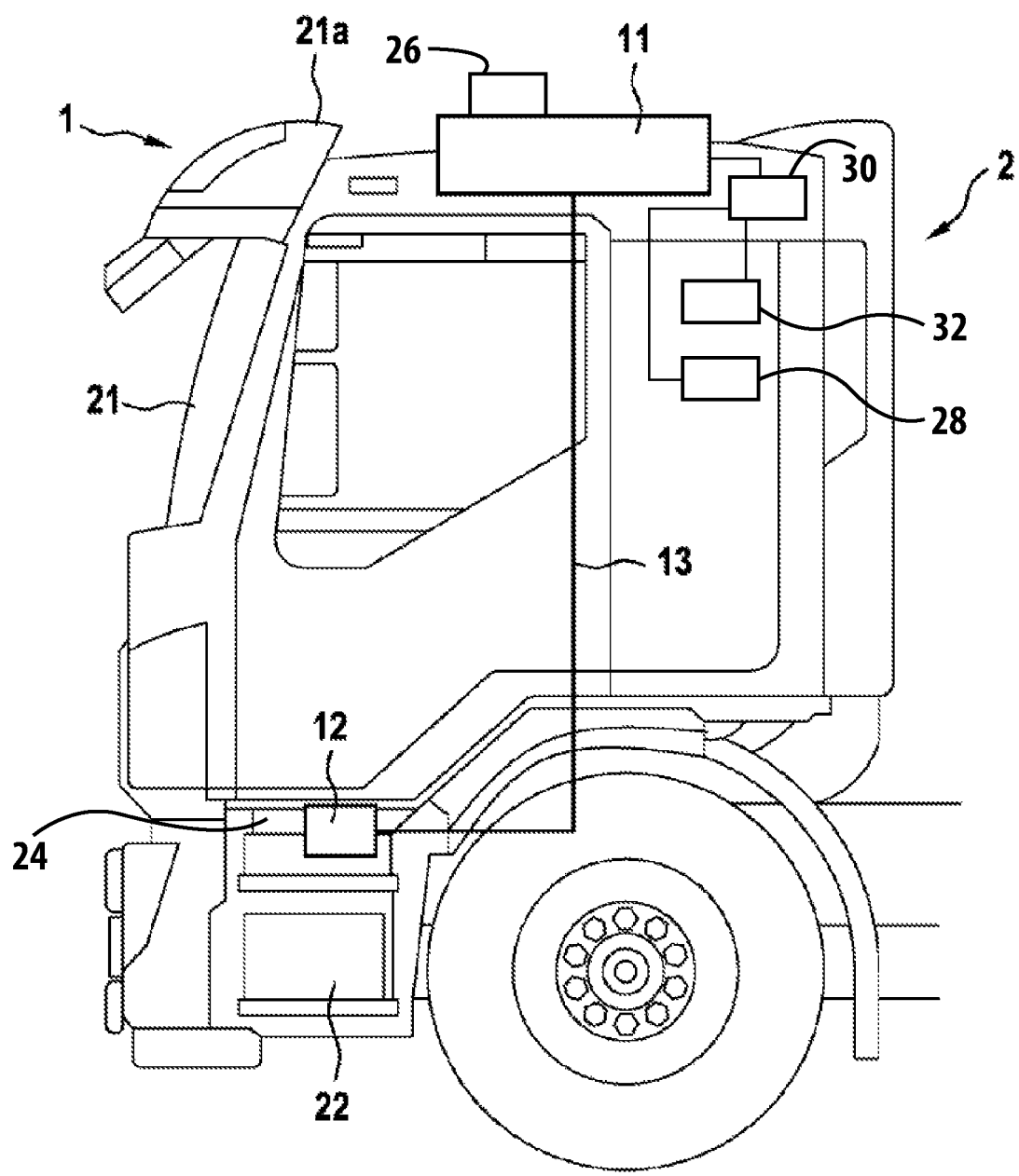
FIG. 1 a schematic representation of an embodiment of the system of the disclosure FIG. 2 a flow diagram of an embodiment of a method of the disclosure

FIG. 1 shows a schematic illustration of an embodiment of the system 1 of the present invention. Illustrated is a motor vehicle, in the present case the tractor of a lorry 2. The system 1 comprises a satellite-based navigation device 11, which is arranged on the roof 21a of the driver's cab 21 of the lorry 2.

The system 1 also comprises an inertial sensor 12, for example an acceleration sensor with acceleration-sensitive elements in all 6 directions in space (6D inertial sensor). The inertial sensor 12 is arranged on the chassis 22 of the lorry 2.

The driver's cab 21 is spring-mounted relative to the chassis 22 with a spring system 24.

The signals or information of the inertial sensors 12 or the acceleration sensors are provided by means of a communication means, for example a bus system 13 of the satellite-based navigation device 11. Conceivable bus systems for this are the CAN bus, FlexRay or Ethernet.

As an alternative to a bus system, a point-to-point connection—for example, based on the SPI or PSI5 standard—can also be used.

Alternatively, radio-based communication means, such as WLAN, Bluetooth, ZigBee, etc. are also conceivable.

FIG. 2 shows a flow diagram of a method 200 for position determination of a motor vehicle, such as the lorry 2, according to one embodiment of the present invention.

In step 201 a position of the lorry 2 is detected by means of a satellite-based navigation device 11.

In step 202, in particular in parallel or substantially simultaneously with step 201, a correction value is determined as a function of a value representing a relative motion between the driver's cab 21 and the chassis 22.

In step 203, in order to determine the position, the detected position is corrected as a function of a correction value, which represents a relative motion between the driver's cab 21 and the chassis 22 of the lorry 2.

In step 203, in order to determine the position, the detected position is corrected as a function of a correction value, which represents a relative motion between the driver's cab 21 and the chassis 22 of the motor vehicle lorry 2.

In some embodiments, the system 1 includes a distance sensor 32 configured to detect the movement of the driver's cab 21.

In another embodiment, an inertial sensor 26 is arranged in or on the navigation device 11. The inertial sensor 26, in one embodiment, is an acceleration sensor.

The system 1, in one embodiment, includes a computer readable storage medium 28 configured to store a computer program for executing the method 200 with an electronic control unit 30 of the system 1.

The invention claimed is:

1. A method for determining a corrected global position of a motor vehicle, the motor vehicle including a chassis and a driver's cab, the driver's cab is spring-mounted relative to the chassis, the method comprising:
   detecting an uncorrected global position of the motor vehicle using a satellite-based navigation device arranged on the driver's cab;
   determining a correction value representing a relative motion between the driver's cab and the chassis; and
   determining the corrected global position by correcting the detected uncorrected global position as a function of the determined correction value.

2. The method as claimed in claim 1, further comprising: determining the correction value as a function of a first signal of a first inertial sensor arranged in the chassis.

3. The method as claimed in claim 2, further comprising: detecting the uncorrected global position as a function of a second signal of a second inertial sensor arranged on or in the navigation device.

4. The method as claimed in claim 3, further comprising: determining the correction value as a function of the first signal and the second signal.

5. The method as claimed in claim 4, wherein the first signal includes at least one of a pitching and rolling motion of the chassis and the second signal includes at least one of a pitching and rolling motion of the driver's cab.

6. The method as claimed in claim 2, wherein the first inertial sensor is an acceleration sensor.

7. The method as claimed in claim 3, wherein the second inertial sensor is arranged on the navigation device according to a tightly coupled approach.

8. The method as claimed in claim 4, further comprising: determining the correction value as a function of a comparison of the first signal and the second signal with each other.

9. The method as claimed in claim 1, wherein the relative motion is a substantially vertical motion of the driver's cab in relation to the chassis, which is determined using a distance sensor.

10. The method as claimed in claim 1, wherein:
    a computer program is stored on a non-transitory computer-readable storage medium, and
    the computer program is configured to execute the method.

11. The method as claimed in claim 1, wherein the method is executed by an electronic control unit.

12. The method as claimed in claim 1, wherein the motor vehicle is a lorry.

13. A system for determining a corrected global position of a motor vehicle, the motor vehicle including a chassis and a driver's cab, the driver's cab is spring-mounted relative to the chassis, the system comprising:
    a satellite-based navigation device arranged on the driver's cab; and
    an electronic control unit operably connected to the satellite-based navigation device and configured to (i) detect an uncorrected global position of the motor vehicle using the satellite-based navigation device; (ii) determine a correction value representing a relative motion between the driver's cab and the chassis; and (iii) determine the corrected global position by correcting the detected uncorrected global position as a function of the determined correction value.

14. The system as claimed in claim 13, further comprising:
    an inertial sensor arranged on the chassis of the motor vehicle.

15. The system as claimed in claim 14, wherein the inertial sensor is an acceleration sensor.

16. The system as claimed in claim 13, further comprising:
- a distance sensor configured to detect the relative motion between the driver's cab and the chassis.

17. The system as claimed in claim 16, wherein the movement is a vertical movement.

18. The system as claimed in claim 13, wherein the motor vehicle is a lorry.

* * * * *